United States Patent [19]

Patrigot

[11] 4,307,863

[45] Dec. 29, 1981

[54] VARIABLE POSITIONABLE HOLDER

[76] Inventor: Léon E. Patrigot, 92, rue Vendome, Lyon, France

[21] Appl. No.: 129,260

[22] Filed: Mar. 11, 1980

[30] Foreign Application Priority Data

Mar. 12, 1979 [FR] France ................................ 79 06919

[51] Int. Cl.³ .............................................. A47G 29/00
[52] U.S. Cl. .................................. 248/126; 248/441 R
[58] Field of Search .............. 240/126, 470, 360, 467, 240/441 R, 450

[56] References Cited

U.S. PATENT DOCUMENTS 2,235,283 3/1941 Carver ........................... 285/470 X
3,385,551 5/1968 McKay ........................... 248/470 X
4,132,018 1/1979 Hughes ........................... 248/126

Primary Examiner—Dave W. Arola
Attorney, Agent, or Firm—Karl F. Ross

[57] ABSTRACT

A holder for objects of various types and of high versatility whereby the objects can be supported upon a surface or suspended from a surface, comprises a base which can rest upon a horizontal surface or adhere to a vertical surface and which is provided with a groove adapted to receive the lower edge of flat objects when they are to be held upright. One wall of the groove is defined by an inclined pedestal for a pair of hooks reaching toward the groove and from which objects can be suspended when the base is affixed to a wall.

5 Claims, 4 Drawing Figures

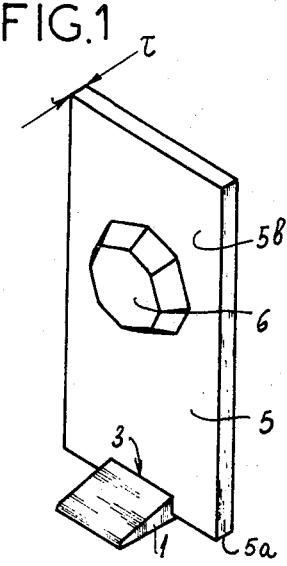
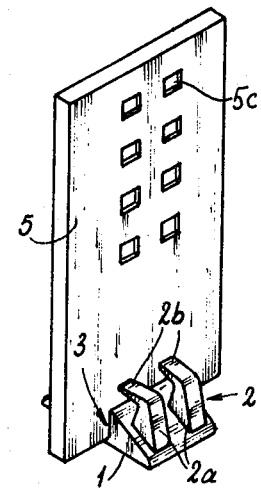
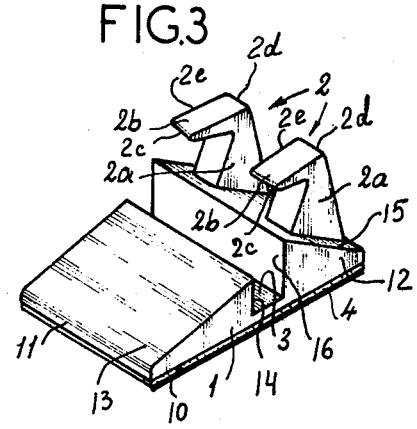
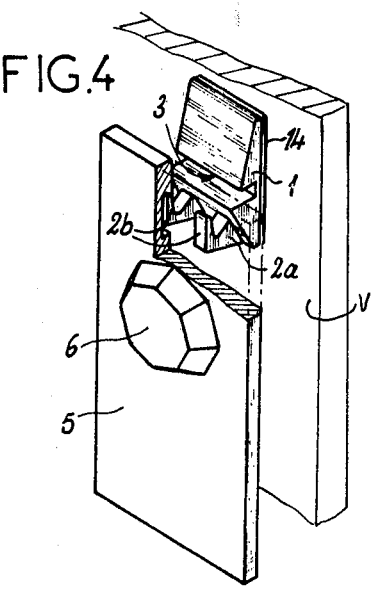

4,307,863

VARIABLE POSITIONABLE HOLDER

FIELD OF THE INVENTION

My present invention relates to a holder for objects of various types with sufficient versatility to allow the holder to support objects upon a horizontal surface as well as upon a vertical surface.

BACKGROUND OF THE INVENTION

It is frequently desirable to provide a holder for an object which can allow the object to be displayed over a good part of its face or body either upon a horizontal surface such as a table or countertop, or upon an upright surface, e.g. a wall, a cabinet or even display panel.

In the past, holders have veen designed for one or another application, i.e. either to support the object upon a horizontal surface or permit to be hung or suspended from an upright surface or structure.

The objects in question can be any generally flat body which must be displayed, such as framed or unframed photographs, laminated pictures or signs, aroma-dispensing plates, deodorant plaques, publicity material or the like.

In the case of aroma-dispensing or deodorizing units, for example, the generally flat object may be removed from its package and seated upon a horizontal surface or hung from a wall or other upright structure. For this purpose separate means were generally required. For example, the unit could be sold with a base which may be removable or permanently affixed, constituting a stand for the object when the latter is placed upon the tabletop, countertop or other article of furniture. In addition, the unit could be provided with hooks or the like enabling it to be mounted upon the wall with or without removal of the base.

In practice this meant that two different elements had to be provided depending upon the nature of the support desired. The suspending element and the stand were mutually incompatible and to produce them required separate manufacturing lines and created additional expense which had to be considered in establishing the sale's price of the object. Furthermore, the two separate elements had to be stored, transported, packaged and distributed so that there were additional costs and inconveniences throughout the line between manufacture and use.

When the objects themselves were distributed without either type of support, the distributors thereof had to stock both types and supply the type desired by the user depending upon whether the objects was to stand upon a horizontal surface or to be suspended from an upright surface.

Frequently the users themselves had to choose between the types of supports and thus were constrained, once a particular support was chosen, to use the object in the manner determined by the nature of the support obtained or provided. The alternatives was, of course, to obtain both types of supports and to store one away while the other was in use.

These circumstances greatly complicated the distribution of objects which required such supports for practical application and rendered such objects inconvenient or unsatisfactory. This was particularly the case for objects such as room or closet deodorizers and aroma-dispensing devices capable of introducing a pleasant aroma into a particular space.

OBJECTS OF THE INVENTION

It is the objects of the present invention to provide an improved holder of greater versatility than earlier holders for the purpose described and which can function as a stand for objects, especially flat objects, upon horizontal surfaces and as a hanger for such objects from upright surfaces.

SUMMARY OF THE INVENTION

This object, and others which will become apparent hereinafter, are attained in accordance with the present invention in a support which comprises a flat base adapted to rest upon the horizontal surface or to be adhered or otherwise secured to an upright surface and which is provided on its opposite side with a groove adapted to receive the base of a flat object to be supported and formed to one side of this groove with a pair of bent arms or hooks whose free ends or fingers are turned toward the opposite side of the groove and which, when the base is affixed to the upright surface, can constitute upwardly open hooks for receiving the object.

According to a feature of the invention, the hooks rise from a pedestal which is tapered away from the groove and is of generally trapezoidal cross section, the inner surfaces of each hook forming an angle of at most 90° while the outer surfaces of the hook are substantially at right angles to one another with the arm portion rising from the pedestal having outer surface perpendicular to the base whereas the outer surface of each finger is parallel thereto. Thus, when the base rests flat upon a tabletop or like planar surface, the flanks of the groove are upright and the flat object can be inserted so that its lower edge rests in the groove whose front flank may be shorter than its rear flank defined by the pedestal mentioned previously.

When the support is mounted upon an upright surface, however, the pedestal may be lowermost with the hooks projecting generally horizontally to suspend the object.

Advantageously, the object comprises an active capsule or element containing a deodorant or aroma-releasing material, upon a rectangular plate, the rear face of which can be formed with indentations adapted to engage over the fingers of the hooks.

The base can be provided with a layer of pressure-sensitive material.

BRIEF DESCRIPTION OF THE DRAWING

The above and other objects, features and advantages of the present invention will become more readily apparent from the following description, reference being made to the accompanying drawing in which:

FIG. 1 is a perspective front view showing an object mounted upon a support in accordance with the present invention in the case in which the support acts as a stand;

FIG. 2 is a rear perspective view of the assembly;

FIG. 3 is a perspective view drawn to a larger scale of the support itself; and

FIG. 4 is a perspective view partly broken away of the assembly disposed so that the object hangs from the support.

SPECIFIC DESCRIPTION

The support of the present invention comprises a one-piece (unitary) body which can be injection molded of a synthetic resin material and comprises a flat rectangular base 1 which is formed with a unique profile as shown in the drawing. The lower surface of the base is planar and carries a layer of pressure-sensitive adhesive 10 to which a removable masking foil 4 is applied so that, upon removal of this foil, the pressure-sensitive adhesive is exposed and can firmly secure the base 1 to a surface.

The base 1 has two portions 11 and 12 of trapezoidal cross section, the front portion 11 having an inclined surface 13 which rises toward the top of a transverse groove 3 at a lower flank 14 thereof. The rear trapezoidal portion 12 has an upper surface 15 which rises more sharply and terminates at the higher rear flank 16 of this groove.

The arms 2a of a pair of hooks 2, rise from the surface 15 and terminate at angularly bent fingers 2b which are pointed toward the groove 3 and have free edges 2c which can be coplanar with the rear face or flank 16 of the groove to form additional contact surfaces for supporting an object 5 when the device is used as a stand.

The rear faces 2d of the arms 2a can be substantially perpendicular to the flat underside of the base 1 and to the outer surfaces 2c of the fingers 2b which may be substantially parallel to the flat bottom face of the base 1.

With the foil 4 in place, the groove 3 can receive the lower edge 5a of a plate 5 carrying a cartridge or ampoule 6 along its front face 5b and adapted to dispense a pleasant aroma while forming a deodorizer capable of asorbing odors from the room in which the object is placed. The thickness of the plate 5 can be substantially equal to the width of the groove 3.

When the object is positioned as shown in FIGS. 1 and 2, the support functions as a stand. The object is received without significant play in the groove and is additionally supported by the fingers 2b.

When the object is to be suspended, the masking layer 4 is removed and the adhesive 14 is pressed against a vertical surface V (FIG. 4) with the groove oriented horizontally and the hooks opening upwardly. These hooks can be inserted into windows 5c and/or pockets formed in the plate 4, or in rings or the like adapted to this plate.

I claim:

1. A support for a flat object comprising a base having a planar surface capable of resting against a horizontal surface and provided with means for affixing said base to an upright surface, said base formed with a transverse groove adapted to receive a lower edge of said object whereby said support can function as a stand for said object, at least one bent arm and projecting from said base and turned toward said groove at one side thereof whereby said arm forms a hook for suspending said object from said upright surface.

2. The support defined in claim 1 wherein a pair of such arms is provided, the arms being spaced apart along said side of said groove.

3. The support defined in claim 2 wherein said groove has a flank along said side of said groove which is coplanar with free ends of said arms.

4. The support defined in claim 3 wherein said base is provided with a relatively low trapezoidal cross-section portion on the other side of said groove and a relatively high trapezoidal cross-section portion on said one side of said groove, the latter portion having an inclined face from which said arms rise.

5. The support defined in claim 1, claim 2, claim 3 or claim 4 wherein said object is a rectangular plate having a thickness corresponding substantially to the width of said groove and provided on a front face of said plate with a deodorizing capsule, a rear face of said plate being formed with windows engageable by said arms.

* * * * *